(12) United States Patent
Kimoto et al.

(10) Patent No.: US 12,007,372 B2
(45) Date of Patent: Jun. 11, 2024

(54) GAS CHROMATOGRAPH DEVICE AND ANALYSIS SUPPORT METHOD FOR GAS CHROMATOGRAPH DEVICE

(71) Applicant: SHIMADZU CORPORATION, Kyoto (JP)

(72) Inventors: Yasuhiro Kimoto, Kyoto (JP); Takuya Isoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 699 days.

(21) Appl. No.: 17/258,996

(22) PCT Filed: Sep. 3, 2018

(86) PCT No.: PCT/JP2018/032609
§ 371 (c)(1),
(2) Date: Jan. 8, 2021

(87) PCT Pub. No.: WO2020/049614
PCT Pub. Date: Mar. 12, 2020

(65) Prior Publication Data
US 2021/0311000 A1   Oct. 7, 2021

(51) Int. Cl.
*G01N 30/78* (2006.01)
*G01N 30/02* (2006.01)
*G06F 3/04847* (2022.01)

(52) U.S. Cl.
CPC ....... *G01N 30/78* (2013.01); *G01N 2030/025* (2013.01); *G06F 3/04847* (2013.01)

(58) Field of Classification Search
CPC .. G01N 30/78; G01N 2030/025; G01N 35/00; G06F 3/04847; G06F 3/0482
See application file for complete search history.

(56) References Cited

U.S. PATENT DOCUMENTS 11,047,835 B2 * 6/2021 Kimoto .............. G01N 30/8675
2019/0277814 A1   9/2019 Kimoto et al.
2019/0346411 A1 * 11/2019 Gianchandani ........ G01N 30/38

FOREIGN PATENT DOCUMENTS

JP    2000-046817 A    2/2000
JP    2011-017606 A    1/2011
JP    2011017606 A  *  1/2011
WO    2018/069959 A1   4/2018

OTHER PUBLICATIONS

Communication dated May 7, 2022 from the Chinese Patent Office in Chinese Application No. 201880096348.1.
International Search Report of PCT/JP2018/032609 dated Nov. 27, 2018 [PCT/ISA/210].
Written Opinion of PCT/JP2018/032609 dated Nov. 27, 2018 [PCT/ISA/237].
Communication dated Oct. 5, 2021, issued by the Japanese Patent Office in application No. 2020-540882.

* cited by examiner

*Primary Examiner* — Freddie Kirkland, III
(74) *Attorney, Agent, or Firm* — Sughrue Mion, PLLC (57) ABSTRACT

A gas chromatograph device (100) includes a calculator (2) configured to acquire information on conduits (36) between a branch unit (33) and detectors (34) and information that identifies types of the detectors connected to the conduits, the calculator being configured to calculate at least one of gas flow rates in the conduits, gas linear velocities in the conduits, or a pressure in the branch unit based on the acquired information.

7 Claims, 4 Drawing Sheets

(FIRST EMBODIMENT)

FIG.1

FIG.2
(FIRST EMBODIMENT)

FIG.3

FIG.4
(FIRST EMBODIMENT)

FIG.5

FIG.6
(SECOND EMBODIMENT)

FIG.7

GAS CHROMATOGRAPH DEVICE AND ANALYSIS SUPPORT METHOD FOR GAS CHROMATOGRAPH DEVICE

CROSS REFERENCE TO RELATED APPLICATIONS

This application is a National Stage of International Application No. PCT/JP2018/032609, filed Sep. 3, 2018.

TECHNICAL FIELD

The present invention relates to a gas chromatograph device, and more particularly, it relates to a gas chromatograph device including a plurality of detectors.

BACKGROUND ART

Conventionally, a gas chromatograph device including a plurality of detectors is known. Such a gas chromatograph device is disclosed in Japanese Patent Laid-Open No. 2011-017606, for example.

Japanese Patent Laid-Open No. 2011-017606 discloses a gas chromatograph device including a sample vaporization chamber, a column, a branch unit, a first detector connected to the branch unit via a first resistance tube, and a second detector connected to the branch unit via a second resistance tube. In Japanese Patent Laid-Open No. 2011-017606, when a user enters parameters such as a pressure in the sample vaporization chamber, a pressure in the branch unit, and characteristic values such as the inner diameters and lengths of the first and second resistance tubes to a computer with an analysis support program installed, the gas flow rates and branch ratios of the first resistance tube and the second resistance tube are calculated based on the entered parameters. The calculated gas flow rates and branch ratios are useful information for determining analysis conditions for the gas chromatograph device to appropriately analyze a sample gas.

PRIOR ART

Patent Document

Patent Document 1: Japanese Patent Laid-Open No. 2011-017606

SUMMARY OF THE INVENTION

Problem to be Solved by the Invention

There are various types of detectors of the gas chromatograph device depending on compounds to be detected, for example. These detectors include detectors with different pressure conditions such as detectors that perform detection at atmospheric pressure (e.g. FIDs: hydrogen flame ionization detectors), detectors that perform detection in a vacuum state (e.g. SCDs: sulfur chemiluminescence detectors and MSs: mass spectrometers), and detectors that apply a back pressure higher than atmospheric pressure to perform detection (e.g. BIDs: dielectric barrier discharge ionization detectors). Pressures in the detectors influence the gas flow rates and branch ratios of the above resistance tubes.

However, in Japanese Patent Laid-Open No. 2011-017606, no distinction is made as to what type of detector is connected to where in the device (whether a connection is made as the first detector or as the second detector) in the analysis support program. A pressure in the detector mounted on or connected to the gas chromatograph device cannot be identified, and thus the pressure in the detector is conceivably processed as a preset constant value when the gas flow rate and the branch ratio are calculated. Thus, conventionally, the pressure in the detector mounted on the gas chromatograph device cannot be identified, and thus the accuracy of a calculated value such as the gas flow rate of the resistance tube may be limited depending on the type of mounted detector.

The present invention is intended to solve the above problem. The present invention aims to provide a gas chromatograph device and an analysis support method for a gas chromatograph device each capable of improving the accuracy of calculated value such as gas flow rates in conduits in consideration of pressures in detectors respectively connected to the branched conduits.

Means for Solving the Problems

In order to attain the aforementioned object, a gas chromatograph device according to a first aspect of the present invention includes a sample introduction unit configured to send a carrier gas and a sample gas, a column configured to separate components of the sample gas introduced from the sample introduction unit, a branch unit provided downstream of the column to branch a conduit of the sample gas into a plurality of conduits, a plurality of detectors connected to the branch unit, and a calculator configured to acquire information on the conduits between the branch unit and the detectors and information that identifies types of the detectors connected to the conduits, the calculator being configured to calculate at least one of gas flow rates in the conduits, gas linear velocities in the conduits, or a pressure in the branch unit based on the acquired information.

The term "types of the detectors" indicates a concept indicating classification based on the principle of component detection or the structures of the detectors, such as the aforementioned FIDs, SCDs, MSs, and BIDs, but in this specification, the term "types of the detectors" indicates a broader concept including classification based on pressure conditions at the time of analysis of the detectors. That is, the information that identifies the types of the detectors may be information that identifies pressure conditions, such as whether the relevant detector is a detector that performs detection at atmospheric pressure, a detector that performs detection in a vacuum state, or a detector that applies a back pressure higher than atmospheric pressure to perform detection. The pressure conditions of the detectors are determined based on the principle of component detection or the structures of the detectors, and thus the pressure conditions of the detectors can also be identified depending on the "types of the detectors" based on the principle of component detection or the structures.

In the gas chromatograph device according to the first aspect, with the aforementioned configuration, the information on the conduits between the branch unit and the detectors and the information that identifies the types of the detectors connected to the conduits are acquired by the calculator, and thus for each of the plurality of detectors connected to the gas chromatograph device, it is possible to grasp which type of detector is connected to which conduit branched from the branch unit. Accordingly, it is possible to identify which conduit of the device the detector used under what pressure condition is connected to, and thus when at least one of the gas flow rates, the gas linear velocities, or the pressure in the branch unit is calculated based on the acquired information, the individual conduits and the pressure conditions of the detectors connected to the conduits can be identified to perform calculation. Consequently, the accuracy of the calculated values such as the gas flow rates in the conduits, the gas linear velocities in the conduits, and the pressure in the branch unit can be improved in consideration of the pressures in the detectors respectively connected to the branched conduits.

In the aforementioned gas chromatograph device according to the first aspect, the calculator is preferably configured to acquire information on lengths and inner diameters of the conduits as the information on the conduits, acquire information on pressures in the detectors connected to the conduits based on the information that identifies the types of the detectors, and acquire information on an analysis condition including any one of the gas flow rates, the gas linear velocities, and the pressure in the branch unit so as to calculate any other of the gas flow rates, the gas linear velocities, and the pressure in the branch unit based on the acquired information. Accordingly, the resistances of the conduits and the pressures in the detectors in paths from the branch unit to the detectors via the conduits can be identified, and thus any one of the gas flow rates, the gas linear velocities, and the pressure in the branch unit is acquired as the analysis condition such that any other of the gas flow rates, the gas linear velocities, and the pressure in the branch unit for achieving the acquired analysis condition can be accurately calculated. For example, when the gas linear velocities are acquired as the analysis condition, the gas flow rates or the pressure in the branch unit for achieving set value of the acquired gas linear velocities can be obtained.

The aforementioned gas chromatograph device according to the first aspect preferably further includes a display configured to display an interface screen configured to receive an information input, and the calculator is preferably configured to cause the display to display the interface screen configured to allow the information on the conduits and the information that identifies the types of the detectors connected to the conduits to be entered in association with each other for the respective conduits branched from the branch unit. Accordingly, a user can enter the information on the conduits and the information that identifies the types of the detectors connected to the conduits on the interface screen. At this time, the conduits and the detectors can be associated with each other to enter information, and thus erroneous entry of a different type of detector that is not connected to the conduit by the user can be significantly reduced or prevented even when the plurality of detectors are connected to the branch unit via the conduits, respectively.

In this case, the calculator is preferably configured to cause the display to display the interface screen including a first entry field for entering the information on the conduits and a second entry field for entering the information that identifies the types of the detectors connected to the conduits identified by the first entry field. Accordingly, the second entry field clarifies the correspondence relationship with the conduits specified by the entered information in the first entry field, and thus erroneous entry by the user can be effectively significantly reduced or prevented.

The aforementioned configuration in which the interface screen including the first entry field and the second entry field is displayed preferably further includes a plurality of connectors configured to allow the conduits from the branch unit and the detectors to be connected thereto, and the calculator is preferably configured to selectably display the types of the detectors connected to the connectors in the second entry field. Accordingly, in the second entry field, the types of detectors actually connected to the connectors can be displayed in the form of choices, and thus erroneous entry of a type different from the actual type of detector by the user can be significantly reduced or prevented. Furthermore, the user only needs to select the type of detector to be entered from the displayed choices, and thus the convenience for the user can be improved.

In the aforementioned gas chromatograph device according to the first aspect, the branch unit is preferably connected to the plurality of detectors via resistance tubes as the conduits and is preferably configured to distribute the sample gas from the column to each of the resistance tubes, and the calculator is preferably configured to further calculate a branch ratio of a gas distributed to each of the resistance tubes connected to the plurality of detectors based on information on the resistance tubes and information that identifies types of the detectors respectively connected to the resistance tubes. When a detector used at atmospheric pressure and a detector used in a vacuum state are mixed, the structures of the conduits are the same as but the branch ratios of the gas are different from those when all the detectors are used under the same pressure conditions. Therefore, in the configuration in which the plurality of detectors are connected in parallel via the branch unit, the branch ratio of the gas distributed to each of the detectors can be more accurately calculated based on the information on the resistance tubes and the information that identifies the types of the detectors respectively connected to the resistance tubes.

In the aforementioned gas chromatograph device according to the first aspect, the branch unit is preferably connected to one of the detectors via a second column as one of the conduits, the second column being provided separately from a first column on an upstream side thereof, and the calculator is preferably configured to calculate at least one of a gas flow rate in the second column, a gas linear velocity in the second column, or a pressure in the branch unit for achieving a flow rate or a linear velocity specified as an analysis condition based on information on the second column and information that identifies a type of the detector connected to the second column. Accordingly, the second column having different characteristics is provided on the downstream side of the first column such that more accurate component separation can be performed. In this case, the gas flow and pressure in the second column from the branch unit to the detector are important for appropriate analysis. Therefore, with the aforementioned configuration, the pressure condition of the detector on the downstream side of the second column can be grasped based on the information that identifies the type of detector connected to the second column, and thus the gas flow and pressure in the second column important for appropriate analysis can be accurately calculated.

An analysis support method for a gas chromatograph device according to a second aspect of the present invention is an analysis support method for a gas chromatograph device including a branch unit provided downstream of a column configured to separate components of a sample gas introduced from a sample introduction unit to branch a conduit of the sample gas into a plurality of conduits, and a plurality of detectors connected to the branch unit, and includes acquiring information on the conduits between the branch unit and the detectors and information that identifies types of the detectors connected to the conduits, and calculating at least one of gas flow rates in the conduits, gas linear velocities in the conduits, or a pressure in the branch unit based on the acquired information.

In the analysis support method for a gas chromatograph device according to the second aspect, with the aforementioned configuration, similarly to the aforementioned first aspect, it is possible to identify which conduit of the device the detector used under what pressure condition is connected to, and thus the accuracy of the calculated values such as the gas flow rates in the conduits, the gas linear velocities in the conduits, and the pressure in the branch unit can be improved in consideration of pressures in the detectors respectively connected to the branched conduits.

Effect of the Invention

According to the present invention, as described above, it is possible to improve the accuracy of the calculated value such as the gas flow rates in the conduits in consideration of the pressures in the detectors respectively connected to the branched conduits.

MODES FOR CARRYING OUT THE INVENTION

Embodiments embodying the present invention are hereinafter described on the basis of the drawings.

First Embodiment

A gas chromatograph device and an analysis support method for a gas chromatograph device according to a first embodiment are now described with reference to FIGS. 1 to 5.

Configuration of Gas Chromatograph Device

Figure 1:
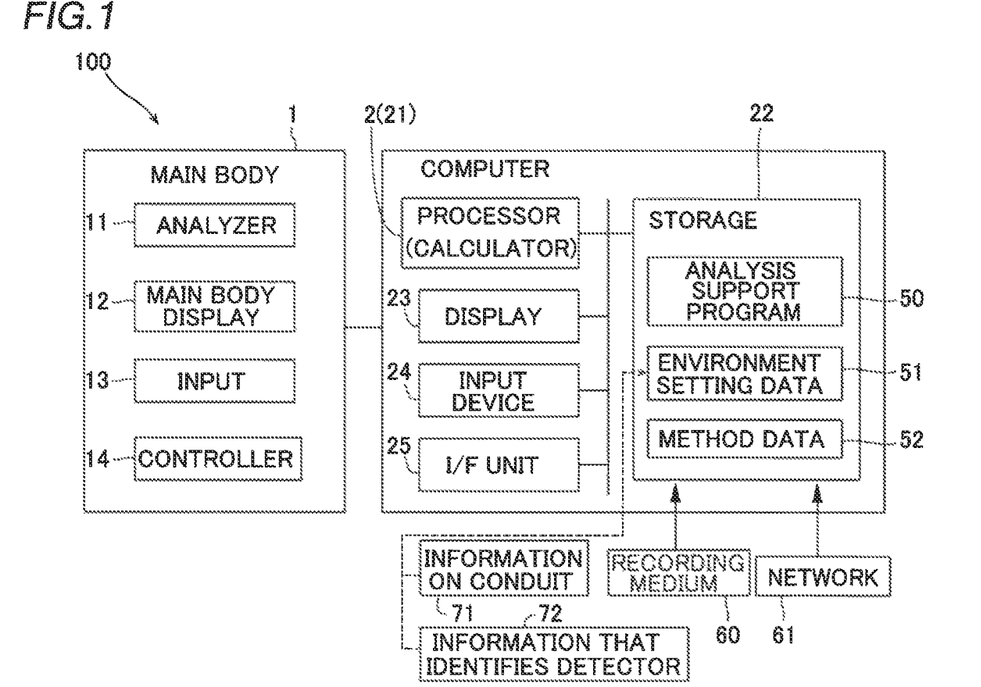
FIG. 1 is a block diagram showing the overall configuration of a gas chromatograph device according to a first embodiment.

As shown in FIG. 1, a gas chromatograph device 100 includes a main body 1 including a housing to house an analyzer 11 therein, and a calculator 2. The calculator 2 is a computer provided separately from the main body 1, and is connected to the main body 1 in a wired or wireless communicable manner.

The main body 1 can be equipped with a plurality of detectors 34 (see FIG. 2), and is connectable to a detector 34 such as a mass spectrometer (MS) provided externally. The main body 1 includes the analyzer 11, a main body display 12, an input 13, and a controller 14. The controller 14 includes a processor and a storage, and the processor thereof controls the main body 1 by executing a control program. The controller 14 acquires data such as analysis conditions by communicating with the calculator 2, and controls the operation of the analyzer 11. Furthermore, the controller 14 transmits detection signals from the detectors 34 to the calculator 2. The main body display 12 includes a liquid crystal display panel, for example, and is configured to display information on the main body 1 such as the analysis conditions in the analyzer 11. The input 13 includes a keypad, a touch panel, or the like, and receives operations of entering various types of information in the main body 1 by a user.

Figure 2:
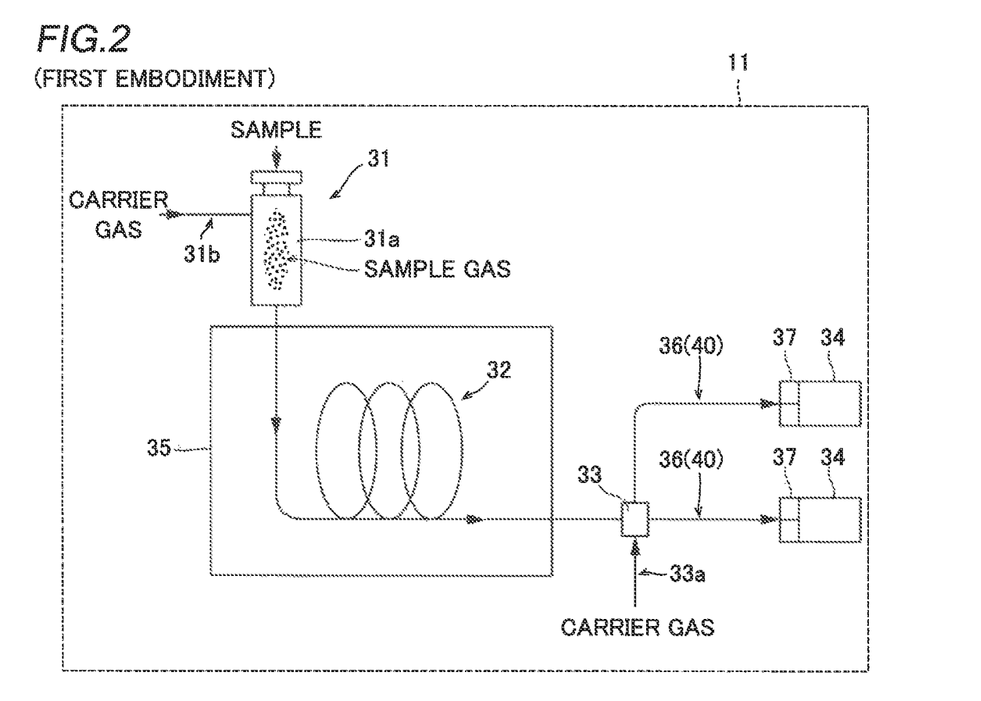
FIG. 2 is a diagram showing the configuration of an analyzer of the gas chromatograph device according to the first embodiment.

As shown in FIG. 2, the analyzer 11 includes a sample introduction unit 31, a column 32, a branch unit 33, and the plurality of detectors 34. Hereinafter, along the gas flow in the gas chromatograph device 100, a direction from the sample introduction unit 31 toward the detectors 34 is referred to as the downstream side (direction), and a direction from the detectors 34 toward the sample introduction unit 31 is referred to as the upstream side.

The sample introduction unit 31 is configured to send out a carrier gas and a sample gas. The sample introduction unit 31 includes a sample vaporization chamber 31a, a carrier gas introduction path 31b, and a heating means (not shown). The sample vaporization chamber 31a is configured to receive a sample from an external sample injection unit (not shown). When the sample is a non-gas such as a liquid, the sample is vaporized into the sample gas in the sample vaporization chamber 31a heated by the heating means. The sample vaporization chamber 31a is connected to an inlet of the column 32. The carrier gas introduction path 31b connects a carrier gas source to the sample vaporization chamber 31a. The carrier gas including an inert gas such as helium is introduced into the sample vaporization chamber 31a via the carrier gas introduction path 31b. The sample introduction unit 31 sends the sample gas in the sample vaporization chamber 31a to the inlet of the column 32 by the supplied carrier gas. The carrier gas and the sample gas are introduced as mobile phases into the column 32.

The column 32 is configured to separate components of the sample gas introduced from the sample introduction unit 31. The column 32 is a tube having a stationary phase in gas chromatography, and a first end (inlet) and a second end (outlet) thereof are open. The inlet of the column 32 is connected to the sample vaporization chamber 31a, and the sample gas flows in via the inlet. The column 32 is housed in an oven 35 of the main body 1. At the time of analysis, the column 32 is heated to a predetermined temperature by the oven 35. The pressure of the carrier gas from the sample introduction unit 31 causes the mobile phases to flow through the column 32 toward the downstream branch unit 33. In the column 32, the components contained in the sample gas are selectively delayed due to the interaction between the mobile phases sent from the sample introduction unit 31 and the stationary phase in the column 32. Thus, the components of the sample gas are separated.

The branch unit 33 is provided downstream of the column 32 and is configured to branch a conduit of the sample gas into a plurality of portions. The branch unit 33 is connected to the second end (outlet) of the column 32 outside the oven 35. The branch unit 33 includes a plurality of outlets. The detectors 34 may be connected to the respective outlets via conduits 36. In the first embodiment, the branch unit 33 is connected to the plurality of detectors 34 via the separate conduits 36. The number of detectors 34 that can be connected to the branch unit 33 is arbitrary, and may be two, three, four, five, or more. The outlet to which none of the detectors 34 (conduits 36) is connected can be blocked.

The branch unit 33 is connected to a carrier gas introduction path 33a. In the branch unit 33, the pressure of the carrier gas introduced via the carrier gas introduction path 33a causes the sample gas to be sent to each of the detectors 34 via the conduits 36.

The conduits 36 connect the branch unit 33 to the detectors 34. The conduits 36 are tubular conduit members. A first end (inlet) of each of the conduit members is connected to any of the outlets of the branch unit 33, and a second end (outlet) thereof is connected to any of the detectors 34 via a connector 37. The conduit members can be resistance tubes 40 or columns. The resistance tubes 40 are tube members, the lengths and inner diameters of which are set so as to have a predetermined conduit resistance. The resistance tubes 40 do not include a stationary phase, unlike the columns 32.

In an example shown in FIG. 2, the branch unit 33 is connected to each of the plurality of detectors 34 via the resistance tubes 40 as the conduits 36, and is configured to distribute the sample gas from the column 32 to the respective resistance tubes 40. In FIG. 2, for convenience, two detectors 34 are connected to the branch unit 33 via two resistance tubes 40.

Each of the plurality of detectors 34 is connected to the branch unit 33. Specifically, the main body 1 includes a plurality of connectors 37 to connect the detectors 34 to the conduits 36. That is, the connectors 37 are connected to the conduits 36 from the branch unit 33 and the detectors 34. The detectors 34 are connected to the separate connectors 37. Each of the detectors 34 receives the sample gas sent via the conduits 36 branched from the branch unit 33. The detectors 34 are configured to detect the components contained in the received sample gas and output electric signals (detection signals). The detection signals are transmitted to the calculator 2 via the controller 14 (see FIG. 1).

There are various types of detectors 34. The detectors 34 are hydrogen flame ionization detectors (FID) sulfur chemiluminescence detectors (SCD), mass spectrometers (MS), dielectric barrier discharge ionization detectors (BID), flame photometric detectors (FPD), thermal conductivity detectors (TCD), flame thermionic detectors (FTD), and electron capture detectors (ECD), for example. These detectors are known, and thus description of the specific detection principle and structure is omitted.

As shown in FIG. 1, the calculator 2 is a computer connected to the main body 1, as described above. The calculator 2 has a function of supporting the design of the analysis conditions in analysis by the gas chromatograph device 100, setting the designed analysis conditions in the gas chromatograph device 100, and acquiring the detection signals output from the respective detectors 34 to perform data processing, for example.

The computer mainly include a processor 21 such as a central processing unit (CPU), a storage 22 such as a volatile memory, a non-volatile semiconductor memory, or a hard disk drive, a display 23 such as a liquid crystal monitor, an input device 24 such as a mouse or a keyboard, and an interface (I/F) unit 25 that is connectable to the main body 1 by wire or wirelessly. As described below, the display 23 can display an interface screen 80 (see FIG. 4) that receives information entered by the user using the input device 24. The processor 21 executes an analysis support program 50 of the gas chromatograph device recorded in the storage 22 such that the computer (processor 21) operates as the calculator 2 of the gas chromatograph device 100. The calculator 2 may be configured by dedicated hardware in which the analysis support program 50 is incorporated.

The analysis support program 50 may be recorded in a computer-readable non-transitory recording medium 60, for example, and provided. The analysis support program 50 recorded in the recording medium 60 is read by a reading device (not shown) of the computer and stored in the storage 22 of the computer. The recording medium 60 includes a non-volatile semiconductor memory, an optical recording medium, or a magnetic recording medium, for example. Furthermore, the analysis support program 50 may be provided from a network 61 connected to the computer via the I/F unit 25 by a transient propagation signal transmitting the analysis support program 50, for example.

Figure 3:
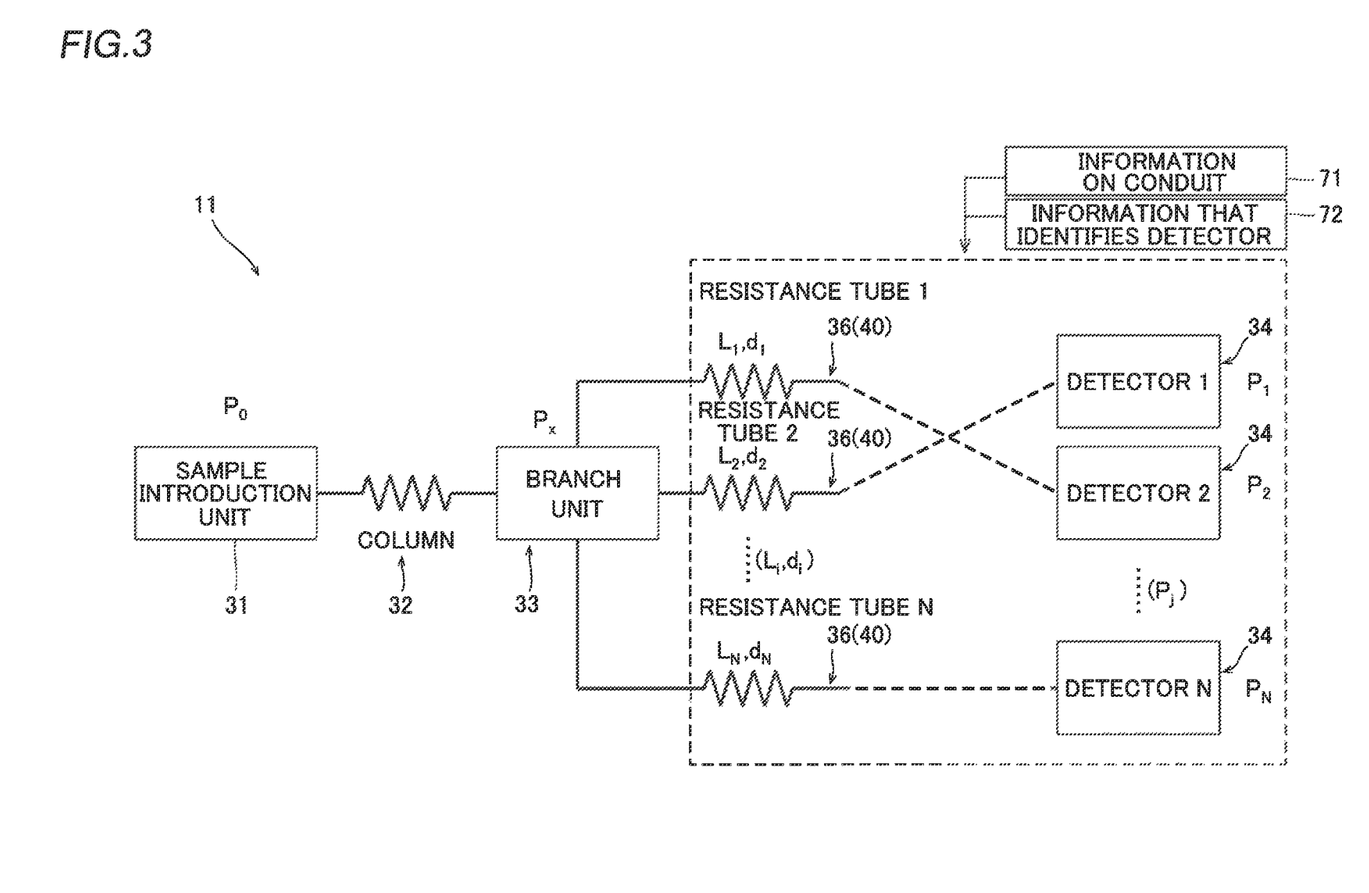
FIG. 3 is a diagram showing the configuration of a sample gas flow path in the gas chromatograph device.

FIG. 3 is a schematic diagram of the configuration of a sample gas flow path in the gas chromatograph device 100. As shown in FIG. 3, N conduits 36 and N detectors 34 can be connected to the branch unit 33. It is arbitrary which conduit 36 is connected to which detector 34 connected to the connector 37 and which type of detector 34 is connected to each connector 37. Therefore, the calculator 2 is configured to acquire information 71 on the conduits between the branch unit 33 and the detectors 34 and information 72 that identifies the types of detectors 34 connected to the conduits 36. The calculator 2 is configured to calculate at least one of gas flow rates in the conduits 36, gas linear velocities in the conduits 36, or a pressure in the branch unit 33 based on the acquired information.

The information 71 on the conduits includes information that can identify each individual conduit 36 connected to the branch unit 33. Furthermore, the information 71 on the conduits includes information about the conduit members of the conduits 36. The information about the conduit members includes characteristic values (the lengths, inner diameters, etc. of the conduit members) that determine the conduit resistances of the conduit members (the resistance tubes 40 or columns). The information 71 on the conduits can individually distinguish a plurality of conduits 36 connected to the branch unit 33 based on the characteristic values.

The information 72 that identifies the types of detectors 34 is information that represents the types of detectors 34 themselves connected to the conduits 36, for example. That is, the information 72 that identifies the types of detectors 34 indicates which type of detector each detector 34 is, such as an FID, an SCD, an MS, a BID, an FPD, a TCD, an FTD, or an ECD, for example. One detector 34 is connected to one conduit 36, and the information 72 that identifies the types of detectors 34 is acquired in association with the individual conduits 36. As shown by broken lines in FIG. 3, it is possible to grasp which of the N conduits 36 connected to the branch unit 33 is connected to which type of detector 34 from the information 71 on the conduits and the information 72 that identifies the types of detectors 34.

Pressure conditions at the time of analysis vary depending on the types of detectors 34. Specifically, the FID, the FPD, the TCD, the FTD, and the ECD are all detectors that perform detection at atmospheric pressure, and the detector pressures are atmospheric pressure. The SCD and the MS are detectors that perform detection in a vacuum state, and the detector pressures are vacuum. The BID is a detector that applies a back pressure higher than atmospheric pressure to perform detection, and the detector pressure is a predetermined value determined according to a discharge gas flow rate. Therefore, in the gas chromatograph device 100, the detector pressure, which is an outlet pressure in each conduit 36, differs depending on which type of detector 34 the conduit 36 is connected to. The pressure conditions at the time of analysis of the respective detectors can be identified based on the information 72 that identifies the types of detectors 34. Consequently, the detector pressures can be identified based on the information 72 that identifies the types of detectors 34.

Interface Screen

The calculator 2 causes the display 23 to display the interface screen 80 (see FIG. 4) configured to allow the information 71 on the conduits and the information 72 that identifies the types of detectors 34 connected to the conduits 36 to be entered in association with each other for the respective conduits 36 branched from the branch unit 33. The calculator 2 acquires the information 71 on the conduits and the information 72 that identifies the types of detectors 34 by receiving an operation input to the interface screen 80 using the input device 24.

Figure 4:
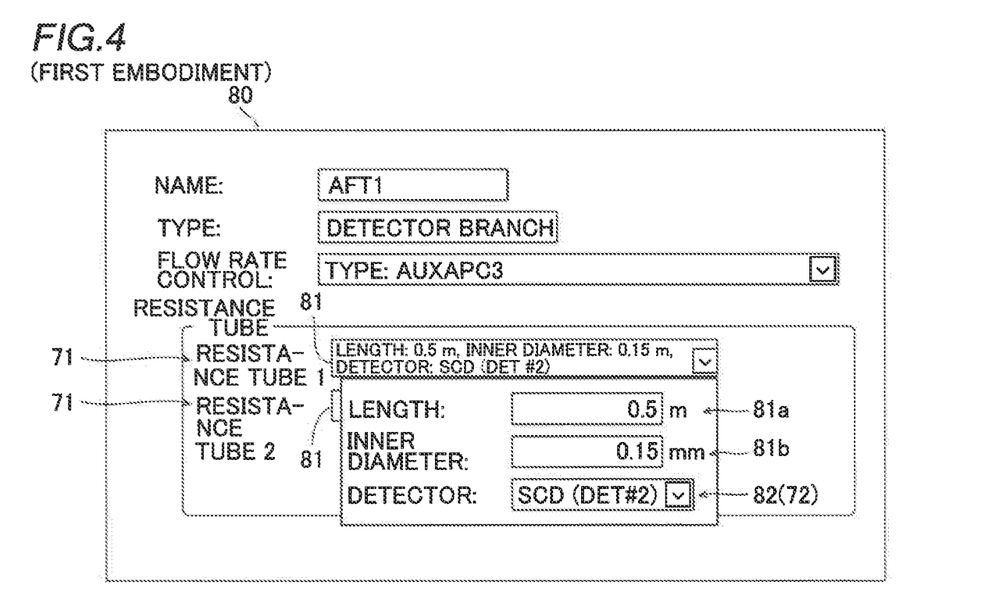
FIG. 4 is a diagram showing an example of an interface screen according to the first embodiment.

As shown in FIG. 4, the calculator 2 causes the display 23 to display the interface screen 80 including a first entry field 81 for entering information on the conduits 36 and a second entry fields 82 for entering the information 72 that identifies the types of detectors 34 connected to the conduits 36 identified by the first entry field 81.

In an example of FIG. 4, the interface screen 80 includes a plurality of (two) first entry fields 81 of "resistance tube 1" and "resistance tube 2". The calculator 2 displays information entry regions 81*a* and 81*b* and the second entry field 82 for the clicked first entry field 81 in response to the user specifying (clicking) the first entry field 81. The example of FIG. 4 shows the situation in which the first entry field 81 of "resistance tube 1" is specified such that the information entry regions 81*a* and 81*b* for "resistance tube 1" and the second entry field 82 for entering the information 72 that identifies the type of detector 34 connected to a conduit 36 identified as "resistance tube 1" are displayed.

The information entry regions 81*a* and 81*b* receive inputs of the length and inner diameter of the conduit 36 ("resistance tube 1" in FIG. 4) as the information 71 on the conduit, respectively. When the user specifies (clicks) the information entry regions 81*a* and 81*b* and enters numerical values, the calculator 2 acquires the information (the length and inner diameter) of this conduit 36. The first entry field 81 is provided for each conduit 36 such that the information 71 on the conduits includes information ("resistance tube 1" or "resistance tube 2") that identifies an individual conduit from the plurality of conduits 36 and information on characteristic values (the length and inner diameter) entered in the first entry field 81 for the identified conduit 36.

The second entry field 82 is provided as a portion of the first entry field 81, and the first entry field 81 is specified (clicked) such that input to the second entry field 82 becomes possible. Thus, in the second entry field 82, the information 72 that identifies the type of detector 34 connected to the conduit 36 can be entered in association with the information 71 on the conduit entered in the first entry field 81.

The calculator 2 is configured to selectably display the types of detectors 34 connected to the connectors 37 (see FIG. 2) in the second entry field 82. Specifically, the calculator 2 is electrically connected to the detectors 34 connected to the respective connectors 37 via the controller 14 (see FIG. 1), and can recognize the types of detectors 34. The calculator 2 displays a list of recognized detectors 34 in the second entry field 82.

In the example of FIG. 4, the second entry field 82 is provided in a drop-down list format. The calculator 2 selectably displays enterable types of detectors 34 in response to the user specifying (clicking) the second entry field 82. When the user selects and specifies (clicks) a corresponding type of detector 34 from a drop-down list of the second entry field 82, the calculator 2 acquires the information 72 that identifies the type of detector 34 connected to the conduit 36 identified by the first entry field 81. FIG. 4 shows an example in which "SCD" is selected as the type of detector 34 connected to "resistance tube 1". "(DET #2)" displayed in the second entry field 82 indicates a detector connected to the second connector 37.

Although not shown, when the user specifies (clicks) the first entry field 81 again after information is entered in the information entry regions 81*a* and 81*b* of the first entry field 81 and the second entry field 82, the calculator 2 hides the information entry regions 81*a* and 81*b* and the second entry field 82. In the first entry field 81, the entered contents ("length", "inner diameter", and "detector") are displayed.

With such a configuration, the calculator 2 acquires the information 71 on the conduits and the information 72 that identifies the types of detectors 34 connected to the conduits 36 via the interface screen 80. The calculator 2 can calculate the gas flow rates, the gas linear velocities, and the pressure in the branch unit 33 using the information 71 on the conduits and the information 72 that identifies the types of detectors 34.

Calculation of Gas Flow Rate, Gas Linear Velocity, Branch Unit Pressure

Calculation of the gas flow rates, the gas linear velocities, and the pressure in the branch unit 33 is now described. The flow of the sample gas in the gas chromatograph device 100 is determined by the pressure in each of the sample introduction unit 31, the branch unit 33, and the detectors 34, the characteristic values (the length, the inner diameter, etc.) that determine the conduit resistances of the column 32 or the conduits 36, and various parameters identified by the configuration and analysis conditions of the gas chromatograph device 100. In the first embodiment, the pressure in the branch unit 33 connected to the carrier gas introduction path 33*a* (see FIG. 2) can be controlled by the controller 14. Therefore, regarding the flow of the sample gas in the conduits 36 between the branch unit 33 and the detectors 34, it is not necessary to consider the characteristic values of the column 32 and a pressure in the sample introduction unit 31 on the upstream side of the branch unit 33.

With reference to FIG. 3, each of the conduits 36 and each of the detectors 34 connected to the branch unit 33 are respectively referred to as a "conduit i" and a "detector j" (i and j=1 to N). The length of the conduit i is defined as $L_i$ [m], the inner diameter of the conduit i is defined as $d_i$ [mm], the flow rate of the sample gas in the conduit i is defined as $F_i$ [ml/min], the linear velocity of the sample gas in the conduit i is defined as $V_i$ [cm/s], and the pressure in the detector j is defined as $P_j$ [absolute pressure; kPa]. The pressure in the branch unit 33 is defined as $P_x$ [absolute pressure; kPa]. The pressure $P_x$ in the branch unit 33 and the pressure P in the detector j may be rephrased as an inlet pressure and an outlet pressure in the conduit 36, respectively.

When the conduit i and the detector j are connected to each other, the flow rate $F_i$ of the sample gas in the conduit i is expressed by the following formula (1).

[Formula 1]

$$F_i = \frac{c_1 \pi d_i^4}{\mu L_i T} \times (P_x^2 - P_j^2) \times \frac{T_s}{P_s} \qquad (1)$$

In the above formula (1), p represents a gas viscosity coefficient [Pa·S], T represents a conduit temperature [K], and $C_1$ represents a predetermined constant. $T_s$ represents a standard temperature, and $P_s$ represents a standard pressure. In the above formula (1), the flow rate is converted into the standard temperature and the atmospheric pressure. The flow rate $F_i$ represents a volumetric flow rate in the conduit.

In the above formula (1), which detector j is connected to the conduit i is grasped from information entered in the interface screen 80 shown in FIG. 4. In an example of FIG. 3, "resistance tube 1 (i=1)" and "detector 2 (j=2)" are connected to each other, and "resistance tube 2 (i=2)" and "detector 1 (j=1)" are connected to each other. Therefore, the flow rate $F_i$ of the sample gas in "resistance tube 1 (i=1)" is expressed by the following formula (2) when i=1 and j=2 in the above formula (1), for example.

[Formula 2]

$$F_1 = \frac{c_1 \pi d_1^4}{\mu L_1 T} \times (P_x^2 - P_2^2) \times \frac{T_s}{P_s} \quad (2)$$

When the conduit i and the detector j are connected to each other, the linear velocity $V_i$ of the sample gas in the conduit i is expressed by the following formula (3).

[Formula 3]

$$V_i = \frac{c_2 \pi d_i^2}{\mu L_i T} \times \frac{(P_x^2 - P_j^2)^2}{(P_x^3 - P_j^3)} \quad (3)$$

$C_2$ represents a predetermined constant. The linear velocity $V_i$ refers to a distance traveled by the carrier gas per unit time in the conduit, and in this specification, the "linear velocity" refers to an average linear velocity in the conduit.

The calculator 2 acquires the length $L_i$ and the inner diameter $d_i$ of the conduit member entered in the first entry field 81 of FIG. 4 as the information 71 on the conduit. Furthermore, the storage 22 (see FIG. 1) stores in advance the value of the detector pressure P according to the type of detector 34. That is, for a detector such as an FID in which the detector pressure is atmospheric pressure, the set value of atmospheric pressure is acquired as the detector pressure $P_j$. For a detector such as an SCD or an MS in which the detector pressure is vacuum, the set value of vacuum pressure is acquired as the detector pressure $P_j$. For a detector such as a BID in which the detector pressure is a predetermined value determined according to the analysis conditions (discharge gas flow rate), the calculator 2 calculates the detector pressure P from the analysis conditions entered in the storage 22.

The calculator 2 acquires information on the analysis conditions including any one of the gas flow rate $F_i$, the gas linear velocity $V_i$, and the pressure $P_x$ in the branch unit 33 to calculate any other of the gas flow rate $F_i$, the gas linear velocity $V_i$, and the pressure $P_x$ in the branch unit 33 based on the acquired information.

That is, in the gas chromatograph device 100, the control mode of the carrier gas can be set as one of the analysis conditions. The control mode includes a mode for controlling the flow rate $F_i$ to a set value (constant value), a mode for controlling the linear velocity $V_i$ to a set value (constant value), and a mode for controlling the branch unit pressure $P_x$ to a set value (constant value). The controller 14 (see FIG. 1) controls the analyzer 11 to maintain any one of the gas flow rate $F_i$, the gas linear velocity $V_i$, and the branch unit pressure $P_x$ specified by the control mode at the set value when performing analysis. The calculator 2 calculates any other of the gas flow rate $F_i$, the gas linear velocity $V_i$, and the branch unit pressure $P_x$ using the specified set value.

For example, in the above formulas (1) to (3), when the set value is specified for the branch unit pressure $P_x$, the calculator 2 substitutes a value of the specified branch unit pressure $P_x$ to calculate the flow rate $F_i$ and the linear velocity $V_i$.

The calculator 2 stores various parameters entered by the user in the storage 22. As shown in FIG. 1, the storage 22 stores environment setting data 51 and method data 52. The environment setting data 51 is data for setting the configuration (environment for analysis) of the gas chromatograph device 100. The calculator 2 stores the acquired information 71 on the conduit (the length $L_i$, inner diameter $d_i$, etc. of the conduit member) and the information 72 that identifies the type of detector 34 connected to the conduit 36 as the environment setting data 51 in the storage 22.

The method data 52 is data for setting the analysis conditions for analysis by the gas chromatograph device 100. Various parameters such as the set value of any of the gas flow rate $F_i$, the gas linear velocity $V_i$, and the pressure $P_x$ in the branch unit 33, the viscosity coefficient $\mu$, the temperature T, and the constants $C_1$ and $C_2$ are entered via an interface screen for method editing (not shown) by the user or calculated from the entered parameters, and are stored as the method data 52 in the storage 22. As described above, the discharge gas flow rate for determining the detector pressure in a case in which the detector is "BID" is also an analysis condition and is included in the method data 52. The calculator 2 can calculate the gas flow rate $F_i$, the gas linear velocity $V_i$, and the branch unit pressure $P_x$ based on these pieces of information. Each parameter used to calculate the gas flow rate $F_i$, the gas linear velocity $V_i$, and the branch unit pressure $P_x$ in the above formulas (1) to (3) can be read from the storage 22 after the user enters the parameter once. In the method data 52, in addition to the above parameters, various parameters necessary for analysis such as a pressure $P_0$ in the sample introduction unit 31 and the temperature rising conditions of the oven 35 are set.

The calculator 2 calculates a branch ratio of a gas distributed to the resistance tube 40 connected to each of the plurality of detectors 34 based on information on the resistance tubes 40 and the information 72 that identifies the types of detectors 34 respectively connected to the resistance tubes 40. The branch ratio is a ratio of the gas flow rate $F_i$ in the conduit 36 connected to each of the detectors 34. In the example of FIG. 3 in which the two detectors 34 are provided, the branch ratio is $F_1:F_2$.

Figure 5:
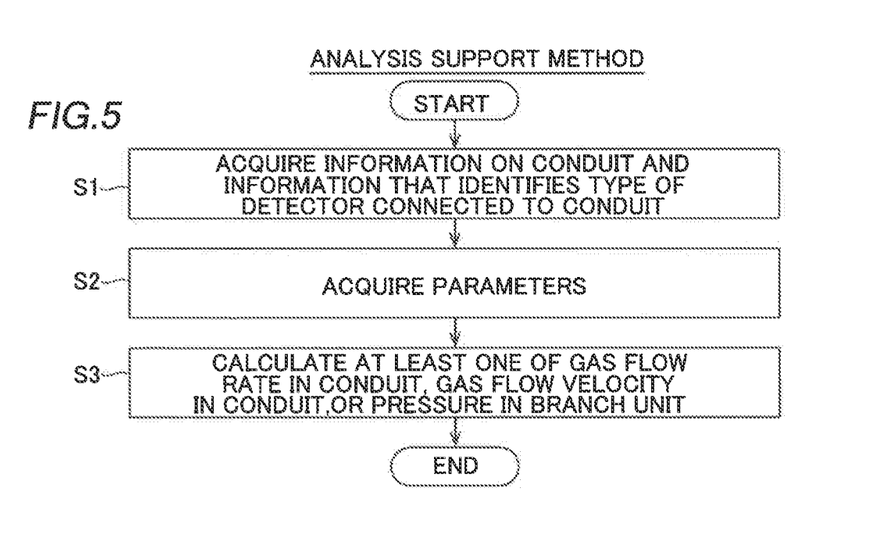
FIG. 5 is a flowchart showing an analysis support method for the gas chromatograph device according to the first embodiment.

The analysis support method for the gas chromatograph device 100 is now described with reference to FIG. 5. In the first embodiment, the analysis support method is executed by the calculator 2.

In step S1, the information 71 on the conduits between the branch unit 33 and the detectors 34 and the information 72 that identifies the types of detectors 34 connected to the conduits 36 are acquired. The calculator 2 receives an information input from the user via the interface screen 80 displayed on the display 23. When each piece of information has been stored as the environment setting data 51 in the storage 22, the calculator 2 acquires each piece of information by reading the environment setting data 51 from the storage 22.

In step S2, the parameters related to the analysis conditions are acquired. The calculator 2 acquires various parameters such as the set value of any of the gas flow rate $F_i$, the gas linear velocity $V_i$, and the pressure $P_x$ in the branch unit 33, the viscosity coefficient $\mu$, the temperature T, the standard temperature $T_s$, the standard pressure $P_s$, and the constants $C_1$ and $C_2$ in the above formulas (1) and (2).

In step S3, at least one of the gas flow rates in the conduits 36, the gas linear velocities in the conduits 36, or the pressure in the branch unit 33 is calculated based on the acquired information. Using the parameters acquired in step S1 and step S2, the calculator 2 calculates at least one of the gas flow rate $F_i$ in the each of the conduits 36, the gas linear velocity $V_i$ in the each of the conduits 36, or the pressure $P_x$ in the branch unit 33 based on the above formulas (1) and (3). The calculator 2 calculates the branch ratio of each of the conduits 36 by calculating the gas flow rate $F_i$ in each of the conduits 36.

The calculator 2 displays information such as values of the calculated gas flow rate $F_i$, gas linear velocity $V_i$, and pressure $P_x$ in the branch unit, and the branch ratio on the display 23. The user can determine whether or not the analysis conditions are appropriate by referring to the displayed information, and modify the method data 52 if necessary. When the analysis conditions are appropriately set, the calculator 2 transmits the set method data 52 to the controller 14 of the gas chromatograph device 100 in response to an input operation performed by the user. In the gas chromatograph device 100, the controller 14 controls each portion according to the method data 52.

Advantages of First Embodiment

In the first embodiment, the following advantages are obtained.

In the first embodiment, as described above, the gas chromatograph device 100 includes the calculator 2 configured to acquire the information 71 on the conduits between the branch unit 33 and the detectors 34 and the information 72 that identifies the types of detectors 34 connected to the conduits 36, and calculate at least one of the gas flow rates in the conduits 36, the gas linear velocities in the conduits 36, or the pressure in the branch unit 33 based on the acquired information. Accordingly, for each of the plurality of detectors 34 connected to the gas chromatograph device 100, it is possible to grasp which type of detector 34 is connected to which conduit 36 branched from the branch unit 33. Therefore, it is possible to identify which conduit 36 of the device the detector 34 used under what pressure condition is connected to, and thus when at least one of the gas flow rates, the gas linear velocities, or the pressure in the branch unit 33 is calculated based on the acquired information, the individual conduits 36 and the pressure conditions of the detectors 34 connected to the conduits 36 can be identified to perform calculation. Consequently, the accuracy of the calculated values such as the gas flow rates in the conduits 36, the gas linear velocities in the conduits 36, and the pressure in the branch unit 33 can be improved in consideration of the pressures in the detectors 34 respectively connected to the branched conduits 36.

In the first embodiment, as described above, the calculator 2 is configured to acquire the resistances of the conduits 36 based on the information 71 on the conduits, acquire the pressures in the detectors 34 based on the information 72 that identifies the types of detectors 34, and acquire the information on the analysis conditions including any one of the gas flow rates, the gas linear velocities, and the pressure in the branch unit 33 so as to calculate any other of the gas flow rates, the gas linear velocities, and the pressure in the branch unit 33 based on the acquired information. Accordingly, the resistances of the conduits 36 and the pressures in the detectors 34 in paths from the branch unit 33 to the detectors 34 via the conduits 36 can be identified, and thus any one of the gas flow rates, the gas linear velocities, and the pressure in the branch unit 33 is acquired as the analysis conditions such that any other of the gas flow rates, the gas linear velocities, and the pressure in the branch unit 33 for achieving the acquired analysis conditions can be accurately calculated.

In the first embodiment, as described above, the gas chromatograph device 100 includes the display 23 configured to display the interface screen 80 configured to receive the information input, and the calculator 2 is configured to cause the display 23 to display the interface screen 80 configured to allow the information 71 on the conduits and the information 72 that identifies the types of detectors 34 connected to the conduits 36 to be entered in association with each other for the respective conduits 36 branched from the branch unit 33. Accordingly, the user can enter the information 71 on the conduits and the information 72 that identifies the types of detectors 34 connected to the conduits 36 on the interface screen 80. At this time, the conduits 36 and the detectors 34 can be associated with each other to enter information, and thus erroneous entry of a different type of detector 34 that is not connected to the conduit 36 by the user can be significantly reduced or prevented even when the plurality of detectors 34 are connected to the branch unit 33 via the conduits 36, respectively.

In the first embodiment, as described above, the calculator 2 causes the display 23 to display the interface screen 80 including the first entry field 81 for entering the information 71 on the conduits and the second entry field 82 for entering the information 72 that identifies the types of detectors 34 connected to the conduits identified by the first entry field 81. Accordingly, the second entry field 82 clarifies the correspondence relationship with the conduits specified by the information entered in the first entry field 81, and thus erroneous entry by the user can be effectively significantly reduced or prevented even when the plurality of detectors 34 are connected to the branch unit 33 via the conduits 36, respectively.

In the first embodiment, as described above, the gas chromatograph device 100 includes the plurality of connectors 37 to which the conduits from the branch unit 33 are connected and the detectors 34 are connected, and the calculator 2 is configured to selectably display the types of detectors 34 connected to the connectors 37 in the second entry field 82. Accordingly, in the second entry field 82, the types of detectors 34 actually connected to the connectors 37 can be displayed in the form of choices, and thus erroneous entry of a type different from the actual type of detector 34 by the user can be significantly reduced or prevented. Furthermore, the user only needs to select the type of detector 34 to be entered from the displayed choices, and thus the convenience for the user can be improved.

In the first embodiment, as described above, the branch unit 33 is connected to the plurality of detectors 34 via the resistance tubes 40 as the conduits 36 and is configured to distribute the sample gas from the column 32 to each of the resistance tubes 40, and the calculator 2 is configured to further calculate the branch ratio of the gas distributed to each of the resistance tubes 40 connected to the plurality of detectors 34 based on the information on the resistance tubes 40 and the information 72 that identifies the types of detectors 34 respectively connected to the resistance tubes 40. For example, when the detector used at atmospheric pressure and the detector used in a vacuum state are mixed, the structures of the conduits 36 are the same as but the branch ratios of the gas are different from those when all the detectors are used under the same pressure conditions. Therefore, in the configuration in which the plurality of detectors 34 are connected in parallel via the branch unit 33, the branch ratio of the gas distributed to each of the detectors 34 can be more accurately calculated based on the information on the resistance tubes 40 and the information 72 that identifies the types of detectors 34 respectively connected to the resistance tubes 40.

Second Embodiment

A gas chromatograph device 200 according to a second embodiment is now described with reference to FIGS. 6 and 7. In the second embodiment, an example in which the configuration of the gas chromatograph device 200 is different from that of the first embodiment is described.

Figure 6:
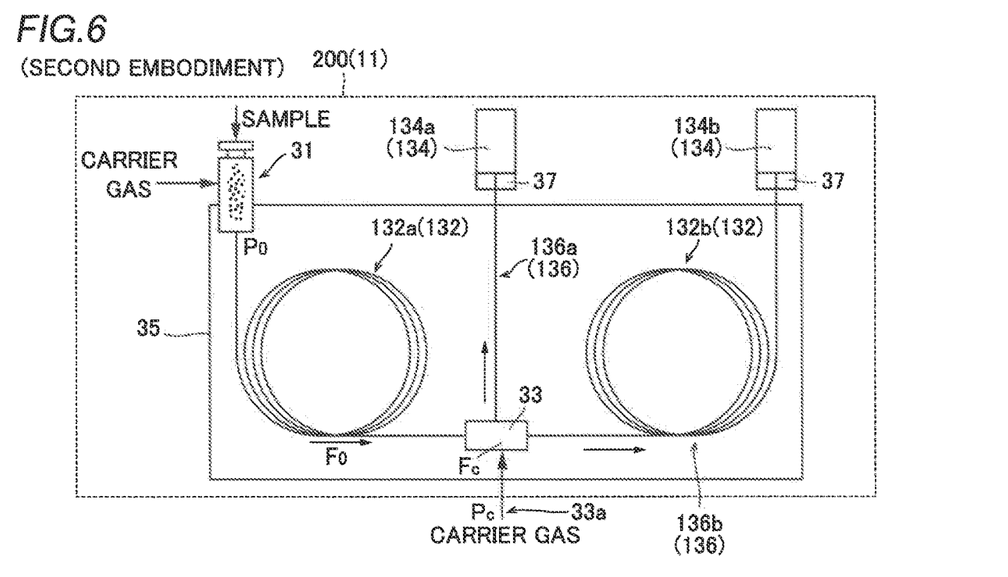
FIG. 6 is a diagram showing the configuration of an analyzer of a gas chromatograph device according to a second embodiment.

As shown in FIG. 6, the gas chromatograph device 200 according to the second embodiment includes a plurality of columns 132, and is configured to separate components of a sample gas in multiple stages by the plurality of columns 132. FIG. 6 shows an example in which the gas chromatograph device 200 is provided with two detectors 134, and the detectors are defined as 134a and 134b, respectively.

In an analyzer 11 of the gas chromatograph device 200, a first end (inlet) of a first column 132a is connected to a sample introduction unit 31, and a second end (outlet) of the first column 132a is connected to a branch unit 33, similarly to the first embodiment. The branch unit 33 is connected to the detector 134a via a conduit 136a. The conduit 136a includes a resistance tube. The branch unit 33 is connected to the detector 134b via a conduit 136b. In the second embodiment, the conduit 136b between the branch unit 33 and the detector 134b includes a column 132b. That is, in the second embodiment, the branch unit 33 is connected to the detector 134b via the second column 132b as a conduit 136, which is provided separately from the first column 132a on the upstream side. Columns having different separation characteristics are used as the first column 132a and the second column 132b.

In the second embodiment, the branch unit 33 is configured to selectively switch between the detector 134a and the detector 134b as a distribution destination of the sample gas under control of a controller 14 (see FIG. 1).

Specifically, the branch unit 33 switches the distribution destination of the sample gas to the detector 134a or the detector 134b by switching a flow path of a carrier gas introduced from a carrier gas introduction path 33a within the branch unit 33. The branch unit 33 is first controlled to make an outlet pressure to the detector 134b larger than an outlet pressure to the detector 134a by switching the path of the carrier gas. In the branch unit 33, the gas from an outlet of the first column 132a is distributed to the detector 134a side depending on the magnitude relationship of the pressure. Consequently, a first component and a second component in the sample gas are first separated in the first column 132a, and the first component is supplied to the detector 134a via the conduit 136a. Then, the distribution destination is switched, and the second component is sent to the second column 132b. That is, the branch unit 33 is controlled to make the outlet pressure to the detector 134a larger than the outlet pressure to the detector 134b by switching the path of the carrier gas. In the branch unit 33, the gas from the outlet of the first column 132a is distributed to the detector 134b side depending on the magnitude relationship of the pressure.

Consequently, in the second column 132b, which has different separation characteristics from the first column 132a, a third component and a fourth component contained in the second component are separated and supplied to the detector 134b. Thus, multiple components can be accurately separated and detected.

Note that the first column 132a and the second column 132b may be housed in a common oven 35 as shown in FIG. 6, or may be housed in separate ovens. In the configuration in which the first column 132a and the second column 132b are housed in separate ovens, the separation characteristics of the columns can be different, and the temperatures and the temperature rising conditions of the columns (ovens) can be set independently.

In the second embodiment, a calculator 2 (see FIG. 1) is configured to calculate at least one of a gas flow rate $F_i$ in the second column 132b, a gas linear velocity $V_i$ in the second column 132b, or a pressure $P_x$ in the branch unit 33 for achieving the flow rate or linear velocity specified as the analysis condition based on information on the second column 132b as information 71 on the conduit and information 72 that identifies the type of detector 134 connected to the second column 132b.

Figure 7:
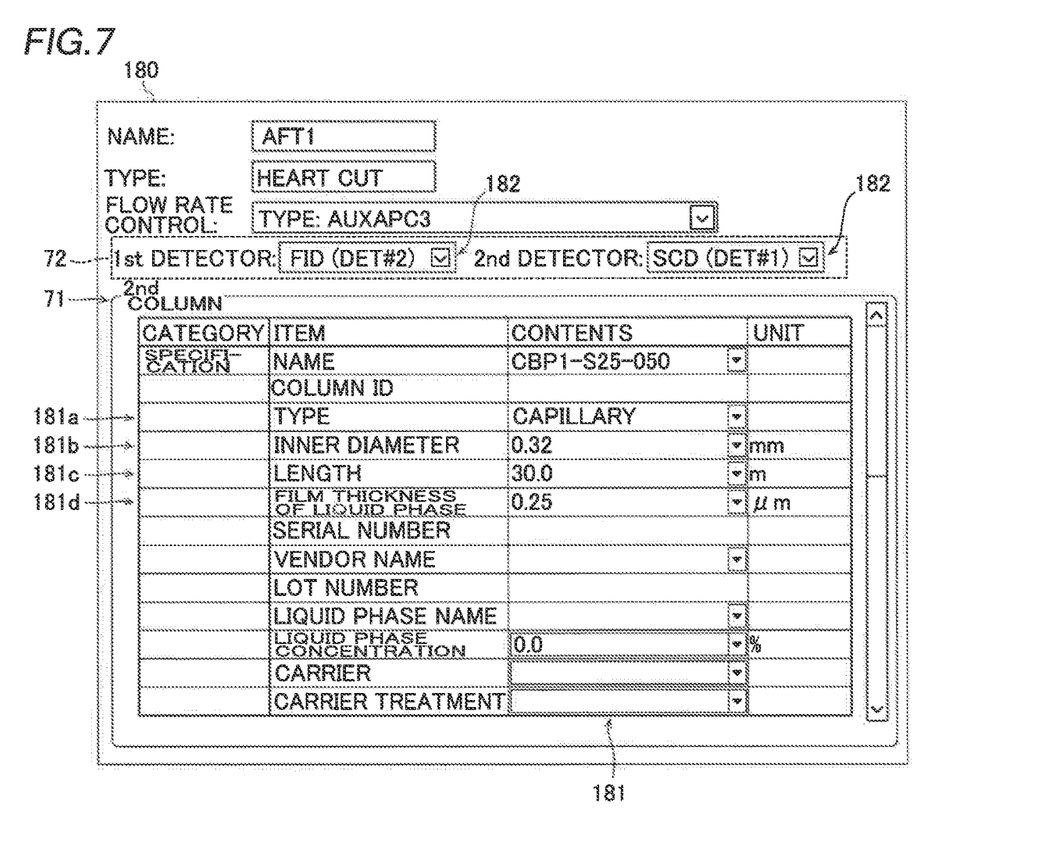
FIG. 7 is a diagram showing an example of an interface screen according to the second embodiment.

The calculator 2 acquires each piece of information via an interface screen 180 shown in FIG. 7, for example. The interface screen 180 includes a first entry field 181 for the second column 132b and two second entry fields 182 corresponding to the detector 134a and the detector 134b, respectively.

In an example of FIG. 7, the first entry field 181 for the second column 132b is displayed as an information entry field of "2nd column". The second entry fields 182 corresponding to the detector 134a and the detector 134b are displayed as information entry fields of "1st detector" and "2nd detector", respectively.

The first entry field 181 includes various information entry regions such as information entry regions 181a to 181d. The information entry regions 181a to 181d respectively receive inputs of a column type, the inner diameter of the column, the length of the column, and a parameter corresponding to the column type as information on a conduit member, which is the second column 132b. In the example of FIG. 7, the column type is "capillary", and thus a parameter of "film thickness of liquid phase" corresponding to this is entered. When a user specifies (clicks) each information entry region and enters a numerical value, the calculator 2 acquires the characteristic values (the type, the length, the inner diameter, and the film thickness of the liquid phase) of the conduit.

The second entry fields 182 are provided separately from the first entry field 181. In the second embodiment, "1st detector" is distinguished from "2nd detector" such that it is identified that "2nd column" and "2nd detector" are connected. The user enters the information that identifies the type of detector 134b connected to the second column 132b in the second entry field 182 of "2nd detector". The calculator 2 acquires the information 72 that identifies the type of detector 134b connected to the conduit 136b (column 132b) from the second entry field 182 of "2nd detector".

The configuration of each of the second entry fields 182 is the same or similar as that of the first embodiment. The calculator 2 selectably displays the types of detectors 134 connected to connectors 37 in the second entry fields 182. When the user selects and specifies (clicks) a corresponding type of detector 134 from a drop-down list of each of the second entry fields 182, the calculator 2 acquires the information 72 that identifies the type of detector 134 connected to the conduit member identified by the first entry field 181. Note that FIG. 7 shows an example in which "1st detector" and "2nd detector" are "FID (DET #2)" and "SCD (DET #1)", respectively.

With such a configuration, the calculator 2 acquires the information 71 on the conduit and the information 72 that identifies the type of detector 134 connected to the conduit 136. Furthermore, the calculator 2 acquires various parameters such as a set value of any of the gas flow rate $F_i$, the gas linear velocity $V_i$, and the pressure $P_x$ in the branch unit 33, a viscosity coefficient $\mu$, a temperature T, and constants $C_1$ and $C_2$ in the above formulas (1) and (2) via an interface screen (not shown) displayed on a display 23 or by reading the same from stored method data 52.

The calculator 2 can calculate the gas flow rate $F_i$, the gas linear velocity $V_i$, the pressure $P_x$ in the branch unit, etc. based on the above formulas (1) to (3) using the information 71 on the conduit and the information 72 that identifies the type of detector 134b. In the second embodiment, the conduit 136b is the second column 132b, and thus the inner diameter $d_i$ of the conduit in the above formula (1) is obtained by d={column inner diameter−(2×film thickness)} in consideration of the stationary phase.

Thus, the calculator 2 calculates at least one of the gas flow rate $F_i$ in the second column 132b, the gas linear velocity $V_i$ in the second column 132b, or the pressure $P_x$ in the branch unit 33 for achieving the flow rate or linear velocity specified as the analysis condition.

In the second embodiment, the calculator 2 calculates a recovery ratio of the sample gas in a case in which the distribution destination of the sample gas is switched from the detector 134a to the detector 134b. The recovery ratio refers to a ratio of the sample gas recovered by the detector 134b after the distribution destination is switched to the detector 134b. Specifically, the calculator 2 obtains a gas flow rate $F_0$ in the first column 132a and a carrier gas flow rate $F_c$ in a flow path that connects an outlet to the detector 134a to an outlet to the detector 134b in the branch unit 33, and calculates the recovery ratio based on the following formula (4).

$$\text{Recovery Ratio} = (F_0 + F_c)/F_0 \quad (4)$$

$F_0$ and $F_0+F_c$ are basically obtained by a similar calculation formula to the above formula (1), and values of variables to be substituted are different. Although details are omitted, the denominator of the formula (4) is represented by a function by which $F_0 = F(D_0, L_0, T_0, \mu_0, P_0, P_{c1})$. $D_0$, $L_0$, $T_0$, and $\mu_0$ represent the inner diameter, the length, the temperature, and the viscosity coefficient of the first column 132a. $P_0$ represents a pressure in the sample introduction unit 31. $P_{c1}$ represents a connector pressure to the first column 132a in the branch unit 33.

The numerator of the formula (4) is represented by a function by which $F_0+F_c = F(D_c, L_c, T_c, \mu_c, P_{c1}, P_{c2})$. $D_c$, $L_c$, $T_c$, and $\mu_c$ represent the inner diameter, the length, the temperature, and the viscosity coefficient of the flow path in the branch unit 33. $P_{c2}$ represents a connector pressure to the second column 132b in the branch unit 33.

The pressures $P_{c1}$ and $P_{c2}$ in the portions of the branch unit 33 are calculated based on values of the pressure $P_c$ of the carrier gas to the branch unit 33, the pressure $P_0$ in the sample introduction unit 31, and detector pressures $P_j$ in the detector 134a and the detector 134b, for example.

As described above, in the branch unit 33, the distribution destination of the sample gas is switched according to the magnitude relationship between the outlet pressure to the detector 134a and the outlet pressure to the detector 134b due to switching of the path of the carrier gas. At this time, depending on the set values such as the pressure $P_0$ in the sample introduction unit 31 and the pressure $P_c$ of the carrier gas to the branch unit 33, the sample gas may flow into the detector 134a side even after the distribution destination of the sample gas is switched to the detector 134b, and in this case, the recovery ratio in the above formula (4) is less than 1 (100%). Therefore, the user sets various parameters (the pressure $P_0$, the pressure $P_c$, the flow rate $F_0$ in the first column 132a, the flow rate $F_i$ in the second column 132b, the linear velocity $V_i$, etc.) such that the recovery ratio calculated by the calculator 2 is 100% or more.

The remaining configurations of the second embodiment are similar to those of the first embodiment.

Advantages of Second Embodiment

In the first embodiment, the following advantages are obtained.

In the second embodiment, similarly to the first embodiment described above, the information 71 on the conduit and the information 72 that identifies the type of detector 134 connected to the conduit 136 are acquired by the calculator 2, and thus the accuracy of the calculated values such as the gas flow rates in the conduits 136, the gas linear velocities in the conduits 136, and the pressure in the branch unit 33 can be improved in consideration of the pressures in the detectors 134 respectively connected to the branched conduits 136.

In the second embodiment, the branch unit 33 is connected to the detector 134b via the second column 132b as the conduit 136, which is provided separately from the first column 132a on the upstream side. Accordingly, the second column 132b having different characteristics is provided on the downstream side of the first column 132a such that more accurate component separation can be performed. In this case, the gas flow and pressure in the second column 132b from the branch unit 33 to the detector 134b are important for appropriate analysis. Therefore, in the second embodiment, as described above, the calculator 2 calculates at least one of the gas flow rate in the second column 132b, the gas linear velocity in the second column 132b, or the pressure in the branch unit 33 for achieving the flow rate or linear velocity specified as the analysis condition based on the information on the second column 132b and the information 72 that identifies the type of detector 134b connected to the second column 132b. Thus, the pressure conditions of the detector 134b on the downstream side of the second column 132b can be grasped based on the information 72 that identifies the type of detector 134b connected to the second column 132b, and thus the gas flow and pressure in the second column 132b important for appropriate analysis can be accurately calculated.

In the second embodiment, the detector pressure $P_j$ can be accurately acquired using the information 72 that identifies the type of detector 134b, and thus the pressures $P_{c1}$ and $P_{c2}$ in the portions of the branch unit 33 can be accurately calculated in the calculation of the recovery ratio in the above formula (4). Consequently, the recovery ratio of the above formula (4) can be more accurately calculated using the detector pressure $P_j$. The user can accurately set various parameters for setting the calculated recovery ratio to 100%, and thus the analysis conditions can be designed more appropriately.

The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the carrier gas introduction path 33a is connected to the branch unit 33, and the pressure of the carrier gas (branch unit pressure $P_x$) in the branch unit 33 is controlled has been shown in each of the aforementioned first and second embodiments, the present invention is not limited to this. In the present invention, it is not necessary to connect the carrier gas introduction path 33a to the branch unit 33 and control the pressure of the carrier gas (branch unit pressure $P_x$) in the branch unit 33. In this case, as shown in FIG. 3, the flow rate and the like in each conduit 36 are adjusted by controlling the pressure $P_0$ in the sample introduction unit 31. The calculator 2 may be configured to calculate the flow rate and the like of the sample gas in each conduit 36 using the pressure $P_0$ in the sample introduction unit 31 and the characteristic values (length, inner diameter, film thickness, etc.) of the column 32 (first column 132a) in the above formulas (1) and (3).

While the detectors 34 such as FIDs and SCDs have been shown as examples in each of the aforementioned first and second embodiments, the present invention is not limited to this. In the present invention, the gas chromatograph device 100 may include a type of detector other than the aforementioned various detectors.

While the example in which the gas chromatograph device 100 calculates the flow rate and the like of the sample gas in each conduit 36 by the calculator 2 provided separately from the main body 1 has been shown in each of the aforementioned first and second embodiments, the present invention is not limited to this. In the present invention, the calculator 2 may be provided in the main body 1. For example, the controller 14 of the main body 1 may be configured to also function as the calculator 2. The controller 14 of the main body 1 may be configured to also function as the calculator 2. That is, the processor provided in the main body 1 may execute the analysis support program 50 for operating as the calculator 2 in addition to executing the program for operating as the controller 14. In this case, the interface screen 80 (180) may be displayed on the display 23 provided outside the main body 1, or may be displayed on the main body display 12 incorporated in the main body 1. In this case, it is not necessary to provide the computer that operates as the calculator 2 outside the main body 1. Alternatively, the main body 1 may separately include a processor that operates as the controller 14 and a processor that operates as the calculator 2.

While the example in which the inputs of the information 71 on the conduits and the information 72 that identifies the types of detectors 34 connected to the conduits 36 are received via the input device 24 provided in the computer as the calculator 2 has been shown in each of the aforementioned first and second embodiments, the present invention is not limited to this. In the present invention, for example, information may be input to the input 13 of the main body 1. Alternatively, information may be input via an external terminal capable of communicating with the computer.

While the example in which the interface screen 80 (180) shown in FIGS. 4 and 7 is displayed has been shown in each of the aforementioned first and second embodiments, the present invention is not limited to this. The display mode of the interface screen 80 (180) shown in FIGS. 4 and 7 is merely an example, and in the present invention, the interface screen of any display mode may be displayed. Furthermore, the interface screen is not limited to displaying the first entry field(s) 81 and the second entry field(s) 82, and any entry field may be provided as long as the information 71 on the conduits and the information 72 that identifies the types of detectors 34 can be entered. Alternatively, in the present invention, information input may be received without displaying the interface screen.

DESCRIPTION OF REFERENCE NUMERALS

2: calculator
23: display
31: sample introduction unit
32, 132: column
33: branch unit
34, 134, 134a, 134b: detector
36, 136, 136a, 136b: conduit
37: connector
40: resistance tube
71: information on conduits
72: information that identifies the types of detectors
80, 180: interface screen
81, 181: first entry field
82, 182: second entry field
100, 200: gas chromatograph device
132a: first column
132b: second column
$d_i$: inner diameter
$L_i$: length
$F_i$: flow rate
$P_j$: detector pressure
$P_x$: branch unit pressure
$V_i$: linear velocity

The invention claimed is:

1. A gas chromatograph device comprising:
a sample introduction unit configured to send a carrier gas and a sample gas;
a column configured to separate components of the sample gas introduced from the sample introduction unit;
a branch unit provided downstream of the column where a conduit of the sample gas is branched into a plurality of branched conduits;
a plurality of detectors connected to the branch unit; and
a calculator configured to acquire;
  information on a connection of the plurality of branched conduits between the branch unit and the plurality of detectors; and
  information for identifying types of the plurality of detectors connected to the plurality of branched conduits,
the calculator being configured to calculate at least one of;
  gas flow rates in the plurality of branched conduits,
  gas linear velocities in the plurality of branched conduits, or
  a pressure in the branch unit based on the acquired information,
wherein the branch unit is connected to the plurality of detectors via a plurality of resistance tubes as the plurality of branched conduits and is configured to distribute the sample gas from the column to each of the plurality of resistance tubes, and wherein the calculator is further configured to calculate a branch ratio of a gas distributed to each of the plurality of resistance tubes connected to the plurality of detectors based on both information of the plurality of resistance tubes and information that identifies types of the plurality of detectors respectively connected to the plurality of resistance tubes.

2. The gas chromatograph device according to claim 1, wherein the calculator is configured to:

acquire information on lengths and inner diameters of the plurality of branched conduits as the information on the plurality of branched conduits;

acquire information on pressures in the plurality of detectors connected to the plurality of branched conduits based on the information that identifies the types of the plurality of detectors; and acquire information on an analysis condition including any one of the gas flow rates, the gas linear velocities, and the pressure in the branch unit so as to calculate any other of the gas flow rates, the gas linear velocities, and the pressure in the branch unit based on the acquired information.

3. The gas chromatograph device according to claim 1, further comprising:

a display configured to display an interface screen configured to receive an information input; wherein the calculator is configured to cause the display to display the interface screen configured to allow the information on the plurality of branched conduits and the information that identifies the types of the plurality of detectors connected to the plurality of branched conduits to be entered in association with each other for respective conduits of the plurality of branched conduits branched from the branch unit.

4. The gas chromatograph device according to claim 3, wherein the calculator is configured to cause the display to display the interface screen including a first entry field for entering the information on the plurality of branched conduits and a second entry field for entering the information that identifies the types of the plurality of detectors connected to the plurality of branched conduits identified by the first entry field.

5. The gas chromatograph device according to claim 4, further comping:

a plurality of connectors configured to allow the plurality of branched conduits from the branch unit and the plurality of detectors to be connected thereto; wherein the calculator is configured to selectably display the types of the plurality of detectors connected to the plurality of connectors in the second entry field.

6. The gas chromatograph device according to claim 1, wherein the branch unit is connected to one of the plurality of detectors via a second column a one of the plurality of branched conduits, the second column being provided separately from a first column on an upstream side thereof; and the calculator is configured to calculate at least one of a gas flow rate in the second column, a gas linear velocity in the second column, or the pressure in the branch unit for achieving a flow rate or a linear velocity specified as an analysis condition based on information on the second column and information that identifies a type of detector connected to the second column.

7. An analysis support method for a gas chromatograph device comprising a branch unit provided downstream of a column configured to separate components of a sample gas introduced from a sample introduction unit where a conduit of the sample gas is branched into a plurality of branched conduits, and a plurality of detectors connected to the branch unit, the analysis support method comprising:

acquiring information on a connection of the plurality of branched conduits between the branch unit and the plurality of detectors; and acquiring information for identifying types of the plurality of detectors connected to the plurality of branched conduits; and calculating at least one of:

gas flow rates in the plurality of branched conduits, gas linear velocities in the plurality of branched conduits, or a pressure in the branch unit based on the acquired information, wherein the branch unit is connected to the plurality of detectors via a plurality of resistance tubes as the plurality of branched conduits, and wherein the analysis support method further comprises:

distributing the sample gas from the column to each of the plurality of resistance tubes, and calculating a branch ratio of a gas distributed to each of the plurality of resistance tubes connected to the plurality of detectors based on both information of the plurality of resistance tubes and information that identifies types of the plurality of detectors respectively connected to the plurality of resistance tubes.

* * * * *